(12) United States Patent
Ren et al.

(10) Patent No.: US 6,466,873 B2
(45) Date of Patent: Oct. 15, 2002

(54) METHOD OF EXTENDED RECURSIVE F-K MIGRATION

(75) Inventors: Jiaxiang Ren, Katy; Steve Kelly, Houston; Ruben Martinez, Sugar Land, all of TX (US)

(73) Assignee: PGS Americas, Inc., Houston, TX (US)

( * ) Notice: Subject to any disclaimer, the term of this patent is extended or adjusted under 35 U.S.C. 154(b) by 121 days.

(21) Appl. No.: 09/740,474

(22) Filed: Dec. 18, 2000

(65) Prior Publication Data

US 2002/0105857 A1 Aug. 8, 2002

(51) Int. Cl.$^7$ ............................................. G01V 1/28
(52) U.S. Cl. .......................................... 702/18; 367/51
(58) Field of Search ............................ 702/18, 17, 14; 367/73, 45, 46, 51, 52

(56) References Cited

U.S. PATENT DOCUMENTS

| | | | |
|---|---|---|---|
| 4,745,585 A | | 5/1988 | Larner |
| 4,888,742 A | | 12/1989 | Beasley |
| 5,233,569 A | | 8/1993 | Beasley et al. |
| 5,285,422 A | * | 2/1994 | Gonzalez et al. ............ 367/52 |
| 5,640,368 A | * | 6/1997 | Krebs ........................ 367/51 |
| 6,002,642 A | * | 12/1999 | Krebs ........................ 367/73 |
| 6,016,461 A | * | 1/2000 | Thore ........................ 702/18 |
| 6,044,039 A | * | 3/2000 | Dunand et al. .............. 702/14 |
| 6,330,512 B1 | * | 12/2001 | Thomas et al. .............. 702/14 |

OTHER PUBLICATIONS

Beasley, C., Lynn, W., Larner, K., and Nguyen, H., Cascaded f–k migration: Removing the restrictions on depth–varying velocity, 53 Geophysics 881–893 (1988).

Draper, N. and Smith, H., Applied Regression Analysis: John Wiley and Sons, Inc., 1–22 (1981).

Gazdag, J., Wave equation migration with the phase–shift method, 43 Geophysics 1342–1351 (1978).

Gazdag, J., and Sguazzero, P., Migration of seismic data by phase shift plus interpolation, 49 Geophysics 124–131 (1984).

Kim, Y. C., Gonzalez, R., and Berryhill, J. R, Recursive wavenumber–frequency migration, 54 Geophysics 319–329 (1989).

Kim, Y. C., Hurt, W. B., Maher, L. J., and Starich, P. J., Hybrid migration: A cost–effective 3–D depth–imaging technique, 62 Geophysics 568–576 (1997).

Larner, K., and Beasley, C., Cascaded migrations: Improving the accuracy of finite–difference migration, 52 Geophysics 618–643 (1987).

Li, Z., Lynn, W., Chambers, R., Larner, K., and Abma, R., Enhancements to prestack frequency–wavenumber (f–k) migration, 56 Geophysics 27–40 (1991).

Mikulich, W., and Hale, D., Steep–dip V(z) imaging from an ensemble of Stolt–like migrations, 57 Geophysics 51–59 (1992).

Harlan, W., Avoiding interpolation artifacts in Stolt migration: Stanford Exploration Project, 103–110 (Sep. 30, 1982).

Rothman, D., Levin, S., and Rocca, F., Residual migration: Applications and limitations, 50 Geophysics 110–126 (1985).

Stolt, R., and Benson, A., Seismic Migration: Theory and Practice, 5 Geophysical Press, 87–95 (1986).

(List continued on next page.)

Primary Examiner—Donald E. McElheny, Jr.

(57) ABSTRACT

A method of migrating seismic event data in the presence of a vertically time-varying velocity field defined by a migration velocity function is provided. The method comprises approximating a migration velocity function by constant stepwise stage velocities. The seismic event data is time stretched and is then successively migrated using residual velocities. After the seismic event data is fully migrated, the effect of time stretching is removed by time unstretching the fully migrated seismic event data by a reverse operation to obtain a finally migrated seismic event data.

14 Claims, 6 Drawing Sheets

OTHER PUBLICATIONS

Stolt, R., Migration by Fourier Transform, 43 Geophysics 23–48 (1978).

Bellman, R., and Dreyfus, S., Applied Dynamic Programming, .Princeton University Press, Princeton, New Jersey, 13–18 (1962).

Beasley, C., and Klotz R., Modified residual migration: 61st Ann. Internat. Mtg., Soc. Explor. Geophys., Extended Abstracts, 114–1117 (1991).

Claerbout, J., Imaging the Earth's Interior: Blackwell Scientific Publications, Ltd., 1–11 (1985).

Rocca, F., and Salvador, L., Residual Migration: $52^{nd}$ Ann. Internat. Mtg., Soc. Explor. Geophys., Extended Abstracts, 4–7 (1982).

Smith, S. W., Digital Signal Processing: California Technical Publishing, pp. 285–296 (1997).

Fomel, S., and Vaillant, L., On Stolt stretch time migration: Stanford Exploration Project, Report SEP–102, 67–77 (Oct. 7, 1999).

Fomel, S., Evaluating the Stolt stretch parameter: Stanford Exploration Project, 61–73 (Sep. 1984).

\* cited by examiner-

METHOD OF EXTENDED RECURSIVE F-K MIGRATION

BACKGROUND OF THE INVENTION

1. Field of the Invention

This invention relates to seismic-data processing, and more particularly to an improved method of migrating seismic data for steeply-dipping reflectors using an extended recursive f-k migration algorithm.

2. Description of the Related Art

Stolt (1978) method of f-k migration (frequency-wavenumber migration), incorporated herein by reference, as originally formulated, is known to be the fastest migration algorithm for 3D data volumes. However, the method requires that the acoustic velocity be constant throughout the propagation media. In order to accommodate lateral and vertical velocity variations, Stolt (1978) developed a strategy for "mimicking" constant velocity by time-stretching the data relative to a constant reference velocity. He also revised and then simplified the dispersion relation to reflect this stretch. The resulting equation contains an "adjustment factor," W, that compensates for the stretch. The W factor defined by Stolt (1978) is a complicated function of time and space and cannot be exactly computed. In practice, a constant W based on heuristic guess is used in f-k migration. Fomel (1995, 1999), incorporated herein by reference, introduced a straight forward analytic technique for estimating W(t) from a velocity profile. However, only an average value can be used in an f-k migration, since the algorithm is performed in the frequency-wavenumber domain.

Regardless of the method by which the W is selected, f-k migration with data stretching is inaccurate for steep dips in the presence of vertical velocity variations. This is due to the fact that the method does not account for ray bending (Mikulich and Hale, 1992, incorporated herein by reference). In addition, since a constant W factor is used in the migration, the result is correct only for a very limited time range; events at earlier or later times are either over-migrated or under-migrated (Beasley et al., 1988, incorporated herein by reference). These are serious shortcomings that can be overcome to some extent in the following ways.

In one of the method to overcome foregoing shortcomings a series of constant-velocity migrations are performed using RMS velocities and the results are interpolated versus time and lateral position. One thus "carves out" from the suite of 3D migrations a final, 3D volume that corresponds to the best migration at each position and time. This can also be an effective tool for pre-stack velocity estimation (Li et al., 1991, incorporated herein by reference). Unfortunately, the optimum migration velocity may differ significantly from the RMS velocity due to ray bending. The "carving" thus requires an interactive display and editing tools, since it is not viable for 'a priori' RMS velocity functions.

In another approach the ray bending effect in the f-k migration is implicitly accounted for through the use of dip-dependent velocities in the time-variable velocity function. This method was developed by Mikulich and Hale (1992), incorporated herein by reference. Unfortunately, this approach requires an inordinate computational effort.

In a yet another approach Beasley, U.S. Pat. No. 4,888,742, incorporated herein by reference, devised a scheme in which he handled a time-variable velocity function by decomposing the migration into a series of constant-velocity migrations. The migrations are thus performed in a recursive, multi-stage fashion, stripping away the portion that is completely migrated in each run. All of the sections that underlie the current stage are thus partially migrated during each migration. Velocity variation is accommodated by stretching the data relative to the constant velocity for the current stage. Ray bending is thus accommodated through the repetitive use of different residual velocities for a given time or depth interval. After each current stage has been migrated, the data are unstretched. A new stretch is then applied that is appropriate for the next migration stage. The repeated time stretching and unstretching is computationally highly burdensome.

Kim et al. (1989, 1997), incorporated herein by reference, developed another method for post-stack and pre-stack migration. In this approach Kim et al. approximate a time-variable velocity function with a coarsely-sampled, stepwise representation. The stepwise function is generated by computing a depth-time curve for vertical propagation and then approximating the curve with a set of contiguous, straight-line segments. The migration is performed in a recursive fashion, with each stage using a constant velocity. The advantages of this method are its speed and simplicity, since the data are not stretched prior to each stage. However, there is no correction for the difference between the true velocity function and its stepwise approximation. Furthermore, the method is inefficient in that it discards, for each stage, the partially migrated wavefield that lies beneath the stage that has just been fully migrated. Each stage is thus migrated using the total migration velocity for that stage. In order to prepare the wavefield for migration of the next stage, a redatuming is performed simply by a phase shift. The accommodation of ray bending is thus effected through an additional, recursive, redatuming step. This approach for handling the ray bending is computationally intensive and wasteful.

Therefore there is a continuing need for developing a method of migration that can account for ray bending and is computationally efficient.

SUMMARY

In view of the described problems there is a continuing need for developing a method of migration of seismic event data that can account for ray bending and is computationally efficient.

A method of migrating seismic event data in the presence of a vertically time-varying velocity field defined by a migration velocity function is provided. The method comprises: approximating the migration velocity function by constant stepwise stage velocities $V_1^{ref}, V_2^{ref}, \ldots, V_n^{ref}$ for stages 1 through n; time stretching the seismic event data to compensate for approximating the migration velocity function by constant stepwise stage velocities, wherein a $1^{st}$ set of data comprising time-stretched seismic event data for stages 1 through n results; migrating the $1^{st}$ set of data using a migration algorithm and using the migration velocity $V_1^{ref}$, wherein stage 1 fully migrated data results, and wherein a $2^{nd}$ set of data comprising partially migrated data for stages 2 through n results; successively migrating $k_{th}$ through $n_{th}$ set of data using the migration algorithm and using a residual migration velocity that is a function of $V_k^{ref}$ and $V_{k-1}^{ref}$, for $k=2,3 \ldots$, n respectively, wherein the $k_{th}$ set of data comprises partially migrated data for stages k through n resulting after migrating the $(k-1)_{th}$ set of data, and wherein stages k through n migrated data result; and time unstretching the stages 1 through n migrated data, wherein a seismic event migrated data results.

BRIEF DESCRIPTION OF THE DRAWINGS

FIG. 3 shows an illustration of the process to manually determine stepwise velocity wherein:

DETAILED DESCRIPTION OF EXAMPLE EMBODIMENTS OF THE PRESENT INVENTION

Referring to FIGS. 1 through 4, in one embodiment of the present invention, a method of migrating seismic event data in the presence of a vertically time-varying velocity field defined by a migration velocity function is provided.

Figure 1:
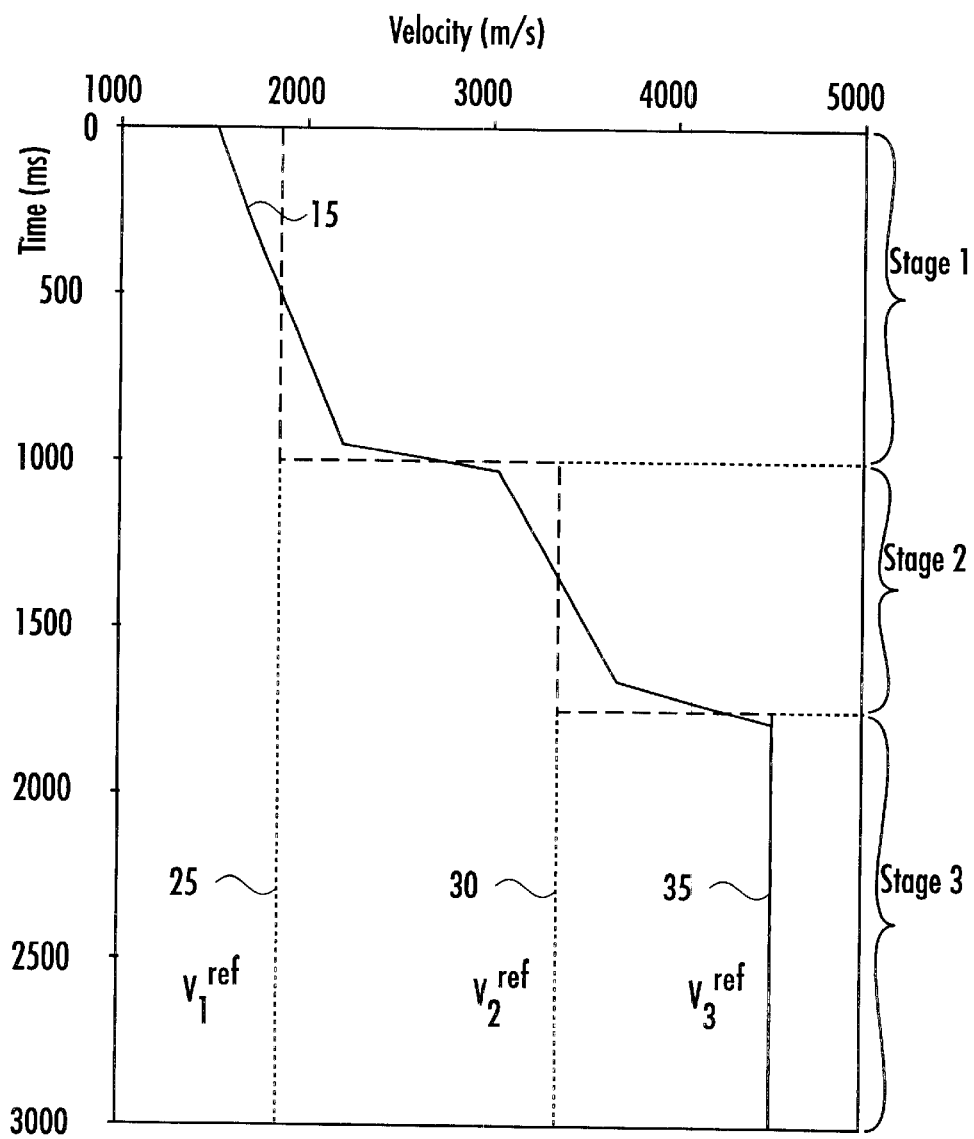
FIG. 1 shows a schematic of interval velocity and its approximated stage velocities.
Figure 3A:
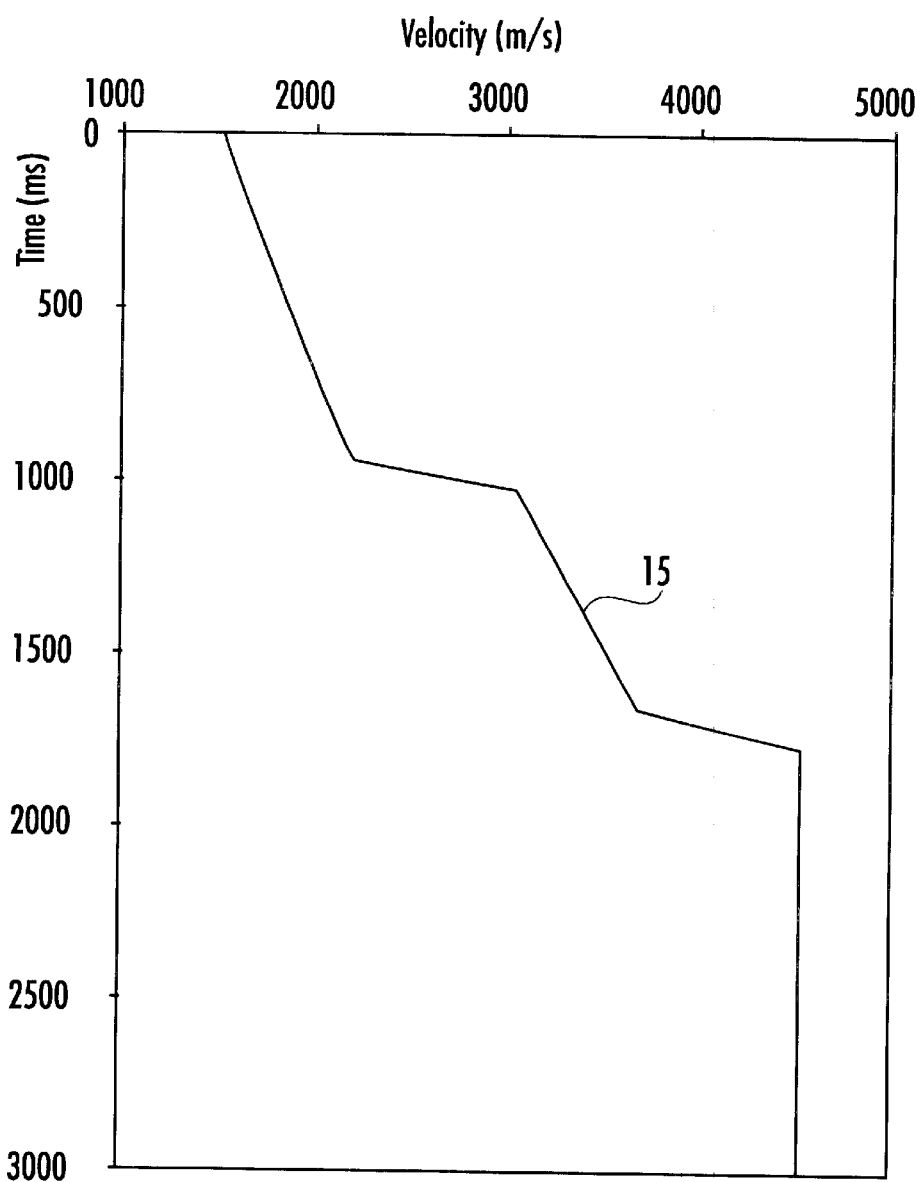
FIG. 3a shows a hypothetical interval velocity profile.
Figure 3B:
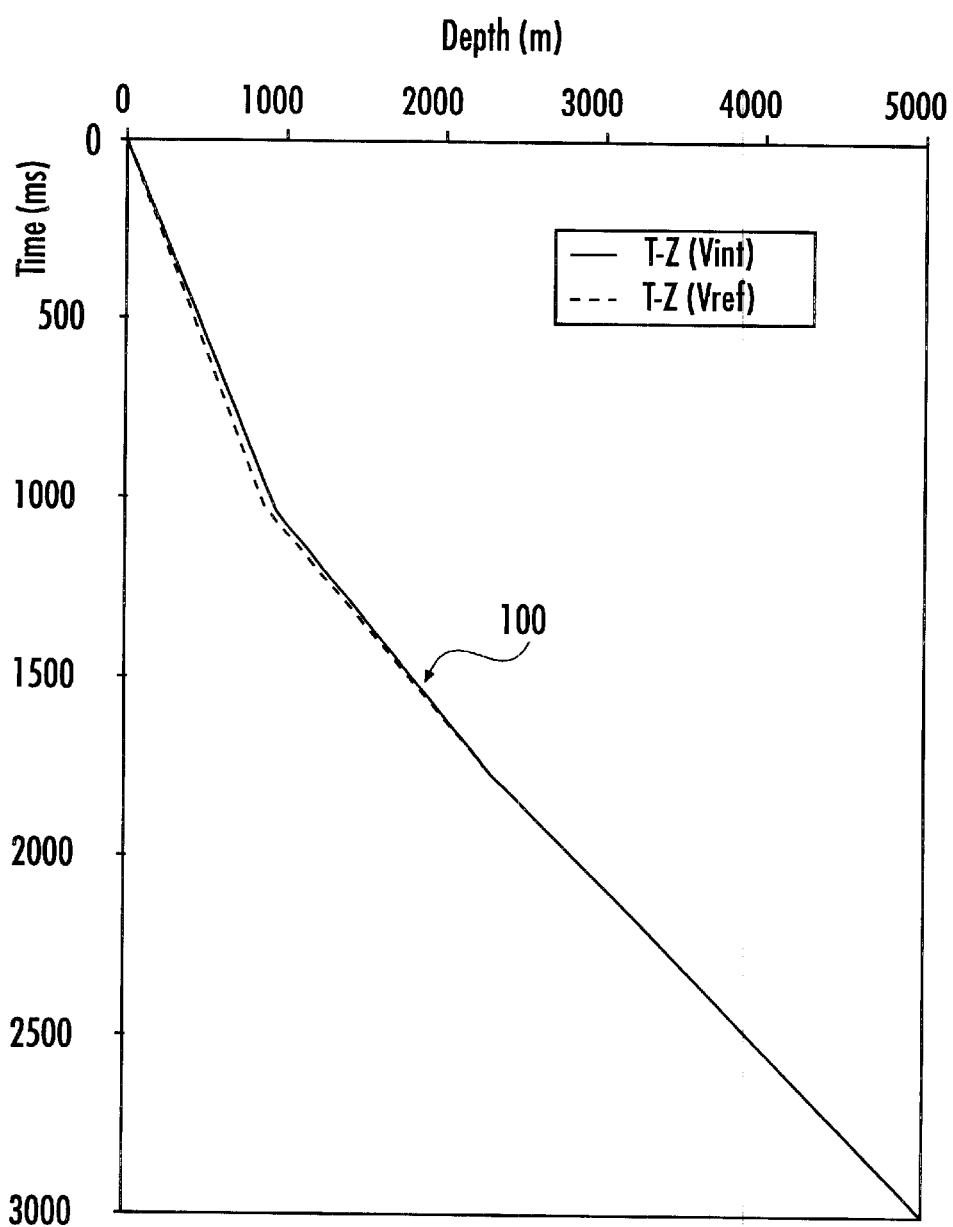
FIG. 3b shows T-Z curve and its piecewise linear approximation.
Figure 3C:
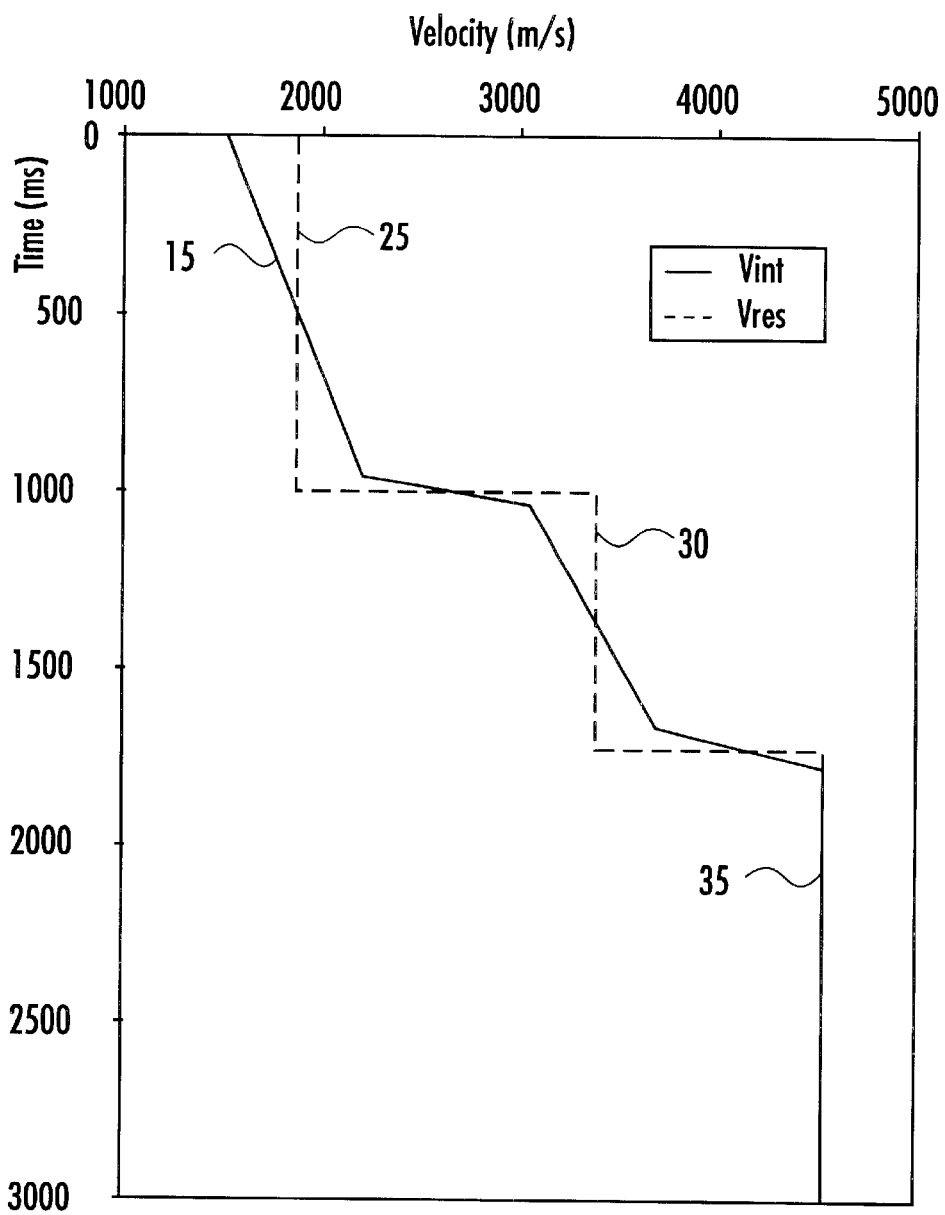
FIG. 3c shows comparison of original and approximated interval velocities.

FIGS. 1 illustrates an example migration velocity function 15 wherein it is desired to migrate a seismic event data 50 in the presence of a vertically time-varying velocity field. For illustration purposes the migration velocity function 15 is approximated by only three constant stepwise stage velocities $V_1^{ref}$ 25, $V_2^{ref}$ 30, and $V_3^{ref}$ 35 for corresponding stages 1 through 3. However, the migration velocity function 15 can be approximated by any desired number of constant stepwise stage velocities. The boundaries of stages can be determined either manually or automatically as described later in more detail. FIGS. 3a through 3c illustrate the process of reduction of a hypothetical interval velocity profile into constant stepwise stage velocities that comprise the migration velocity function 15. FIG. 3a shows a hypothetical interval velocity profile 15. FIG. 3b shows T-Z curve and its piecewise linear approximation 100. FIG. 3c shows the resulting constant stepwise stage velocities 25, 30, 35 of the hypothetical example superimposed on the hypothetical interval velocity profile 15.

Figure 2:
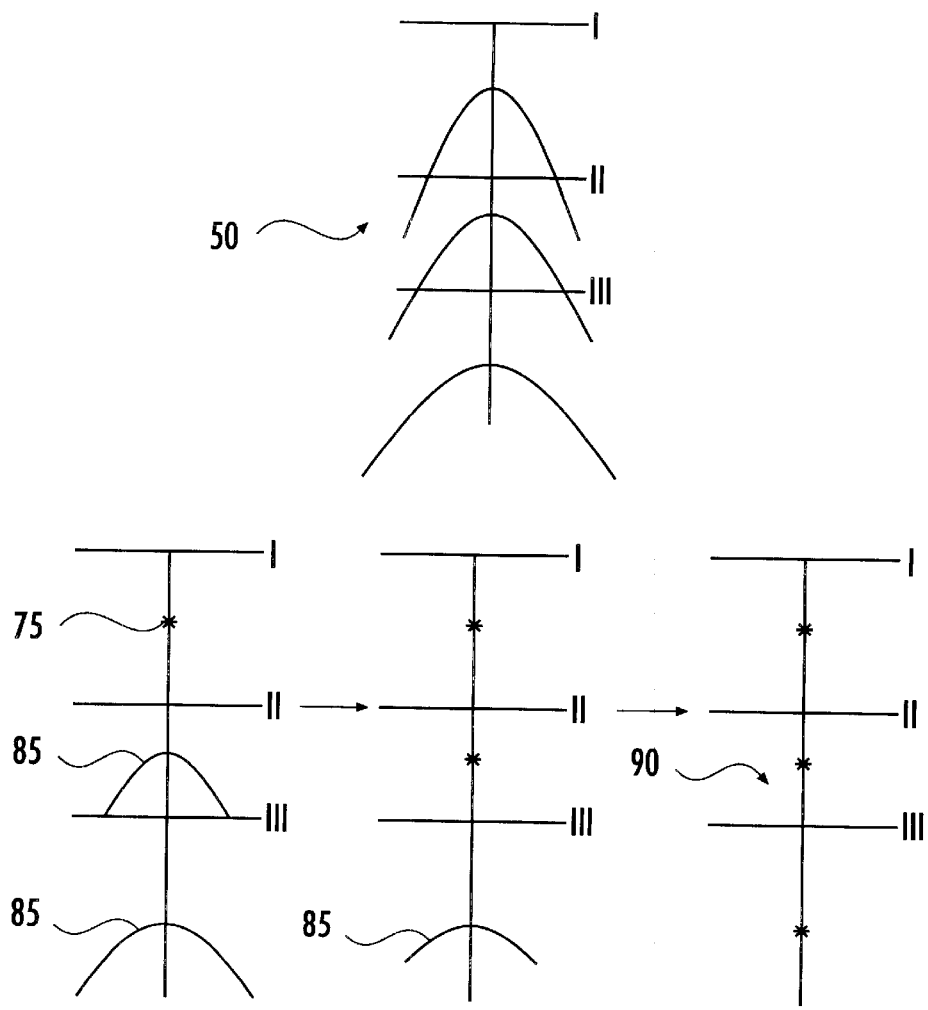
FIG. 2 shows an illustration of recursive migration.

In FIG. 2 the seismic event 50 is divided into only three stages for illustration of the successive migration method of the invention to be described in the following paragraphs. FIG. 2 further shows progression of the migration process through the illustrated three migration stages.

Figure 4:
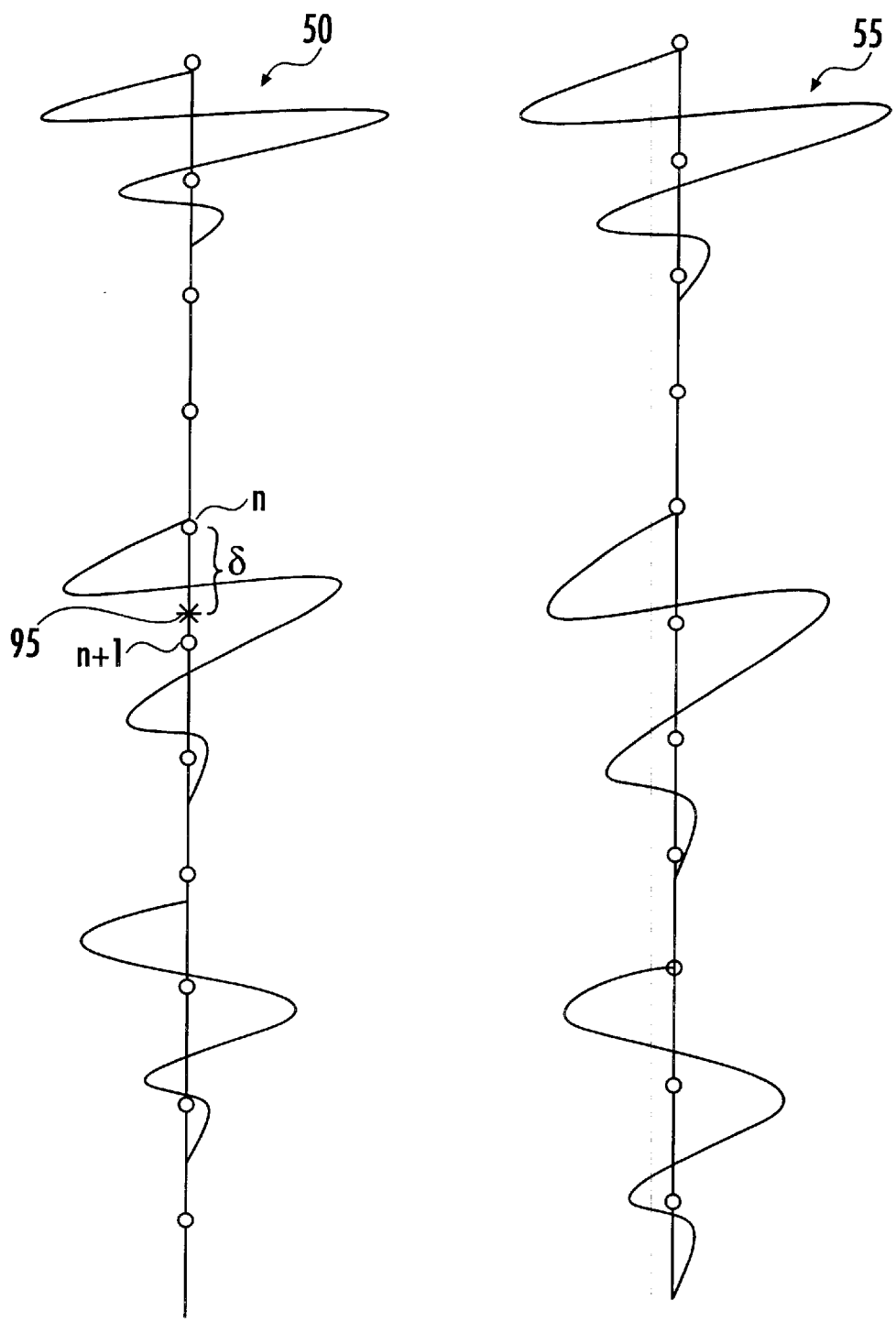
FIG. 4 shows a schematic illustration of trace stretching.

FIG. 4 shows a schematic illustration of time stretching of the before stretching seismic event data 50 into the time-stretched seismic event data 55. FIG. 4 also shows interpolation of a data point 95 lying between two sampled data points, which can be done by, for example, using a sinc filter with a Hamming window, and using other interpolation techniques that would occur to those skilled in the art.

Now referring to FIGS. 1 through 4, an embodiment of the method of migrating seismic event data 50 in the presence of a vertically time-varying velocity field defined by a migration velocity function 15 is provided. The method comprises: approximating the migration velocity function 15 by constant stepwise stage velocities $V_1^{ref}$ 25, $V_2^{ref}$ 30, ..., $V_n^{ref}$ for stages 1 through n; time stretching the seismic event data 50 to compensate for approximating the migration velocity function by constant stepwise stage velocities, wherein a $1^{st}$ set of data comprising time-stretched seismic event data 55 for stages 1 through n results; migrating the $1^{st}$ set of data using a migration algorithm, for example, f-k migration, finite difference migration, Kirchhoff migration, and other that would occur to one skilled in the art, and using the migration velocity $V_1^{ref}$ 25, wherein stage 1 fully migrated data 75 results, and wherein a $2^{nd}$ set of data 85 comprising partially migrated data for stages 2 through n results; successively migrating $k_{th}$ through nth set of data 85 using the migration algorithm and using a residual migration velocity that is a function of $V_k^{ref}$ and $V_{k-1}^{ref}$, for k=2,3 . . ., n respectively, wherein the $k_{th}$ set of data comprises partially migrated data for stages k through n resulting after migrating the (k−1)th set of data, and wherein stages k through n migrated data 90 result; and time unstretching the stages 1 through n migrated data 90, wherein a seismic event migrated data results.

In another embodiment of the method, the migration velocity function 15 comprises acoustic velocity in the media as a function of time. In a yet another embodiment the stages 1 through n are manually defined from the migration velocity function 15 as the operator may decide. In a still another embodiment boundaries of the stages 1 through n are defined by minimizing a function of the migration velocity function 15 and the constant stepwise stage velocities 25, 30, 35 . . . . n. In a yet still another embodiment boundaries of the stages 1 through n are defined by minimizing an objective function comprising difference between travel time corresponding to the migration velocity function 15 and computed travel time corresponding to the constant stepwise stage velocities 25, 30, 35 . . . n. In a still further embodiment the objective function comprises:

$$\Phi(m, S, E) = \sum_{k=1}^{m} \sum_{j=S(k)}^{E(k)} [T_j - T'(z_j)]^2$$

Where $T_j$ is the true two-way time to depth $Z_j$, and $T'(Z_j)$ is the interpolated two-way time from regression, m is the number of stages, S and E are m-length vectors of indices for the top and bottom of the stages.

In a further still another embodiment the constant stepwise stage velocities 25, 30, 35 . . . n comprise stage interval values of the migration velocity function 15 defined for stages 1 through n. In a further still yet another embodiment the time stretching comprises time stretching the seismic event data according to following equation:

$$\int_0^T t' [V_{RMS}^{ref}(t')]^2 \, dt' \int_0^t t' [V_{RMS}(t')]^2 \, dt' \quad (1)$$

where t is the unstretched time, T is the corresponding stretched time, $V_{RMS}^{ref}(t)$ is the RMS velocity of the approximated, constant stepwise stage velocities 25, 30 . . . n, and $V_{RMS}(t)$ is the corresponding RMS velocity of a true interval velocity function. The $V_{RMS}^{ref}(t)$ and $V_{RMS}(t)$ are calculated by:

$$[V_{RMS}^{ref}(t)]^2 = \frac{1}{t} \int_0^t [V^{ref}(t')]^2 \, dt' \quad (2)$$

and $$[V_{RMS}(t)]^2 = \frac{1}{t} \int_0^t [V(t')]^2 \, dt'. \quad (3)$$

In a yet still another embodiment a data point lying between two sampled data points is interpolated using a sinc filter with a Hamming window. The sinc filter and the Hamming window are well known in the art (Harlan (1982), Smith (1997)). Other filters with different window functions can be used in place of the sinc filter and the Hamming window as would occur to one skilled in the art. In a still another embodiment the migration algorithm comprises Stolt (also known as f-k) algorithm. In an alternate embodiment the migration algorithm for migrating the $1^{st}$ set of data and the migration algorithm for successively migrating $k_{th}$ through nth set of data are different migration algorithms, for example, one can select f-k migration, finite difference migration, or Kirchhoff migration algorithm for migrating the $1^{st}$ set of data and can select f-k migration, finite difference migration, or Kirchhoff migration algorithm for successively migrating $k_{th}$ through $n_{th}$ set of data, and other combinations and permutations of migration algorithms as would occur to one skilled in the art. In another alternate embodiment the residual migration velocity is equal to SQRT(($V_k^{ref})^2-(V_{k-1}^{ref})^2$), for k=2,3 . . . , n, wherein k represents the stage number. In a yet another alternate embodiment wherein the time unstretching comprises applying operation to reverse the effect of time stretching of equation (1). In a still further alternate embodiment steps (b) through (e) of claim 1 are repeated for migrating each of a plurality of seismic events 50.

While certain preferred embodiments of the invention have been described herein, the invention is not to be construed as being so limited, except to the extent that such limitations are found in the claims.

References

Beasley, C., Lynn, W., Larner, K., and Nguyen, H., 1988, Cascaded f-k migration: Removing the restrictions on depth-varying velocity: Geophys., 53, 881–893.

Beasley, C., 1989, Method of migrating seismic data: U.S. Pat. No. 4,888,742.

Fomel, S., 1999, On Stolt stretch time migration: Stanford Exploration Project, SEP-84, 61–74.

Fomel, S., 1995, Evaluating the Stolt stretch parameter: Stanford Exploration Project, SEP-84, 61–74.

Harlan, W., 1982, Avoiding interpolation artifacts in Stolt migration: Stanford Exploration Project, SEP-30, 103–110.

Kim, Y. C., Gonzalez, R., and Berryhill, J. R, 1989, Recursive wavenumber-frequency migration: Geophys., 54, 319–329.

Kim, Y. C., Hurt, W. B., Maher, L. J., and Starich, P. J., 1997, Hybrid migration: A cost-effective 3-D depth-imaging technique: Geophys., 62, 568–576.

Li, Z., Lynn, W., Chambers, R., Larner, K., and Abma, R., 1991, Enhancements to prestack frequency-wavenumber (f-k) migration: Geophys., 56, 27–40.

Mikulich, W., and Hale, D., 1992, Steep-dip V(z) imaging from an ensemble of Stolt-like migrations: Geophys., 57, 51–59.

Smith, S. W., 1997, Digital Signal Processing, California Technical Publishing.

Stolt, R., 1978, Migration by Fourier transform: Geophys., 43, 23–48.

What is claimed is:

1. A method of migrating seismic event data in the presence of a vertically time-varying velocity field defined by a migration velocity function, the method comprising:

(a) approximating the migration velocity function by constant stepwise stage velocities $V_1^{ref}, V_2^{ref}, \ldots, V_n^{ref}$ for stages 1 through n;

(b) time stretching the seismic event data to compensate for approximating the migration velocity finction by constant stepwise stage velocities, wherein a $1^{st}$ set of data comprising time-stretched seismic event data for stages 1 through n results;

(c) migrating the $1^{st}$ set of data using a migration algorithm and using the migration velocity $V_1^{ref}$, wherein stage 1 migrated data results, and wherein a $2^{nd}$ set of data comprising partially migrated data for stages 2 through n results;

(d) successively migrating $k_{th}$ through $n_{th}$ set of data using the migration algorithm and using a residual migration velocity that is a finction of $V_k^{ref}$ and $V_{k-1}^{ref}$, for k=2,3 . . . , n respectively, wherein the $k_{th}$ set of data comprises partially migrated data for stages k through n resulting after migrating the $(k-1)_{th}$ set of data, and wherein stages k through n migrated data result; and (e) time unstretching the stages 1 through n migrated data, wherein a seismic event migrated data results.

2. A method as in claim 1, wherein the migration velocity function comprises acoustic velocity in the media as a function of time.

3. A method as in claim 1, wherein the stages 1 through n are manually defined from the migration velocity function.

4. A method as in claim 1, wherein boundaries of the stages 1 through n are defined by minimizing a function of the migration velocity function and the constant stepwise stage velocities.

5. A method as in claim 1, wherein boundaries of the stages 1 through n are defined by minimizing an objective function comprising difference between travel time corresponding to the migration velocity function and computed travel time corresponding to the constant stepwise stage velocities.

6. A method as in claim 1, wherein the objective function comprises $$\Phi(m, S, E) = \sum_{k=1}^{m} \sum_{j=S(k)}^{E(k)} [T_j - T'(z_j)]^2$$

Where $T_j$ is the true two-way time to depth $Z_j$, and $T'(Z_j)$ is the interpolated two-way time from regression, m is the number of stages, S and E are m-length vectors of indices for the top and bottom of the stages.

7. A method as in claim 1, wherein the constant stepwise stage velocities comprise stage interval values of the migration velocity function defined for stages 1 through n.

8. A method as in claim 1, wherein the time stretching comprises time stretching the seismic event data according to following equation:

$$\int_0^T t'[V_{RMS}^{ref}(t')]^2 \, dt' \int_0^t t'[V_{RMS}(t')]^2 \, dt' \quad (1)$$

where t is the unstretched time, T is the corresponding stretched time, $V_{RMS}^{ref}(t)$ is the RMS velocity of the approximated, constant stepwise stage velocities, and $V_{RMS}(t)$ is the corresponding RMS velocity of a true interval velocity function. The $V_{RMS}^{ref}(t)$ and $V_{RMS}(t)$ are calculated by $$[V_{RMS}^{ref}(t)]^2 = \frac{1}{t}\int_0^t [V^{ref}(t')]^2 \, dt' \qquad (2)$$

and $$[V_{RMS}(t)]^2 = \frac{1}{t}\int_0^t [V(t')]^2 \, dt'. \qquad (3)$$

9. A method as in claim 8, wherein a data point lying between two sampled data points is interpolated using a sinc filter with a Hamming window.

10. A method as in claim 1, wherein the migration algorithm comprises Stolt (also known as f-k) algorithm.

11. A method as in claim 1, wherein the migration algorithm for migrating the $1^{st}$ set of data and the migration algorithm for successively migrating $k_{th}$ through $n_{th}$ set of data are different migration algorithms.

12. A method as in claim 1, wherein the residual migration velocity is equal to $SQRT((V_k^{ref})^2 - (V_{k-1}^{ref})^2)$, for $k=2,3 \ldots, n$.

13. A method as in claim 1, wherein the time unstretching comprises applying operation to reverse the effect of time stretching of equation (1).

14. A method as in claim 1, wherein steps (b) through (e) are repeated for migrating each of a plurality of seismic events.

* * * * *